United States Patent
Sng

(10) Patent No.: US 8,873,256 B2
(45) Date of Patent: Oct. 28, 2014

(54) WIND TURBINE WITH A CONTROLLER CONFIGURED TO MANAGE RESONANT EFFECTS

(75) Inventor: Eng Kian Kenneth Sng, Singapore (SG)

(73) Assignee: Vestas Wind Systems A/S, Aarhus N. (DK)

(*) Notice: Subject to any disclaimer, the term of this patent is extended or adjusted under 35 U.S.C. 154(b) by 614 days.

(21) Appl. No.: 13/167,105

(22) Filed: Jun. 23, 2011

(65) Prior Publication Data

US 2012/0022714 A1    Jan. 26, 2012

Related U.S. Application Data

(60) Provisional application No. 61/357,581, filed on Jun. 23, 2010.

(30) Foreign Application Priority Data

Jun. 23, 2010    (DK) ................... 2010 70285

(51) Int. Cl.
*H02H 7/10* (2006.01)
*F03D 9/00* (2006.01)
*H02J 3/38* (2006.01)
*H02P 9/00* (2006.01)

(52) U.S. Cl.
CPC .......... *H02J 3/386* (2013.01); *H02P 2009/004* (2013.01); *Y02E 10/763* (2013.01)
USPC ............................................. 363/50; 290/44

(58) Field of Classification Search
CPC ........................ H02J 3/386; H02P 2009/004
USPC .......... 363/34, 37, 50, 52, 55; 290/44; 361/18
See application file for complete search history.

(56) References Cited

U.S. PATENT DOCUMENTS

| | | | |
|---|---|---|---|
| 5,567,994 A | 10/1996 | Davis et al. | |
| 5,731,965 A | 3/1998 | Cheng et al. | |
| 7,518,263 B2* | 4/2009 | Gan et al. | 307/32 |
| 7,855,467 B2* | 12/2010 | Kawazoe et al. | 290/44 |
| 7,978,445 B2* | 7/2011 | Ritter | 361/18 |
| 8,577,508 B2* | 11/2013 | Li et al. | 700/287 |
| 2004/0145357 A1 | 7/2004 | Lynch et al. | |

* cited by examiner

*Primary Examiner* — Matthew Nguyen
(74) *Attorney, Agent, or Firm* — Patterson & Sheridan, LLP

(57) ABSTRACT

A method and apparatus of operating a controller usable for operating a wind turbine is provided. The wind turbine includes a voltage converter being connectable to a power grid via a filter arrangement. The method includes determining a line voltage and adding the determined line voltage to the output of the voltage converter with a time delay. The time delay is adjusted such that resonant effects occurring at the filter arrangement are decreased.

20 Claims, 6 Drawing Sheets

WIND TURBINE WITH A CONTROLLER CONFIGURED TO MANAGE RESONANT EFFECTS

CROSS-REFERENCE TO RELATED APPLICATIONS

This application claims the benefit of U.S. Provisional Application No. 61/357,581, filed Jun. 23, 2010. This application also claims foreign priority benefits under 35 U.S.C. §119 to Danish application no. PA 2010 70285, filed on Jun. 23, 2010. Each of the aforementioned related patent applications is herein incorporated by reference in its entirety.

TECHNICAL FIELD

The present invention relates generally to a method of operating a wind turbine. More particularly, the invention relates to a controller usable for operating a wind turbine.

BACKGROUND

Wind turbines are generally connected to a power grid via a converter, for example, a full scale converter. A 3MW converter typically has a resonance frequency of about 1 kHz. In the absence of a current controller for the converter, a sudden change in the supply voltage to the power grid may excite the resonant mode of a system including the converter, a grid filter and grid impedance (i.e. transformer and line impedance), and may result in high peak transient currents. Such high peak transient currents may activate the converter protection system and may result in unwanted tripping of the wind turbines.

One possible way to mitigate the high transient peak currents is to use passive damping. A shunt damping circuit for the resonant frequency can be placed in parallel with a capacitor connected to the converter and the power grid. However, inductance and capacitance elements of the shunt damping circuit are required to be tuned to the resonant frequency. Energy dissipation occurs with the resistor(s) of the shunt damping circuit.

An alternative way is to use active damping where an output current of the converter is controlled to emulate a current of a damping circuit. However, a high current controller bandwidth is required to control the output current of the converter at the resonant frequency (i.e. about 1 kHz).

SUMMARY

According to one embodiment of the present invention, a method of operating a wind turbine is provided. The wind turbine includes a voltage converter being connectable to a power grid via a filter arrangement. The method includes determining a line voltage and adding the determined line voltage to the output of the voltage converter with a time delay, wherein the time delay is adjusted such that resonant effects occurring at the filter arrangement are decreased.

According to one embodiment of the present invention, the line voltage is sampled at regular time intervals to generate a plurality of voltage samples.

According to one embodiment of the present invention, the method includes generating a cancellation voltage based on the plurality of voltage sample values; adding the cancellation voltage to the output of the voltage converter; and updating the cancellation voltage at regular time intervals.

According to one embodiment of the present invention, the cancellation voltage is calculated from a linear combination of different voltage sample values that are weighted by respective voltage sample weighting coefficients.

According to one embodiment of the present invention, at least one of the voltage sample weighting coefficients is based on an optimization parameter $t_{predict}$ which adjusts the time delay with which the determined line voltage is applied to the output of the voltage converter.

According to one embodiment of the present invention, the cancellation voltage is determined using a discrete transformation series.

According to one embodiment of the present invention, the discrete transformation series has an order of at least 3.

According to one embodiment of the present invention, the cancellation voltage is generated by modifying a voltage converter controlling signal.

According to one embodiment of the present invention, a controller usable for operating a wind turbine is provided. The wind turbine includes a voltage converter being connectable to a power grid via a filter arrangement. The controller includes an input unit being configured to receive a signal indicative of a line voltage and a controlling unit coupled to the input unit. The controlling unit being configured to (i) add the line voltage indicated by the received signal to an output of the voltage converter with a time delay, and (ii) adjust the time delay such that resonant effects occurring at the filter arrangement are decreased.

According to one embodiment of the present invention, the signal received by the input unit is a sampling signal resulting from sampling the line voltage at regular time intervals.

According to one embodiment of the present invention, the controlling unit is configured to control a process of a) generating a cancellation voltage based on the sampling signal; b) adding the cancellation voltage to the output of the voltage converter; and repeating a) and b).

According to one embodiment of the present invention, the controlling unit is configured to calculate the cancellation voltage from a linear combination of different voltage sample values of the sampling signal being weighted by respective voltage sample weighting coefficients.

According to one embodiment of the present invention, at least one of the voltage sample weighting coefficients is based on an optimization parameter $t_{predict}$ which adjusts the time delay with which the determined line voltage is applied to the output of the voltage converter.

According to one embodiment of the present invention, the cancellation voltage is determined using a discrete transformation series.

According to one embodiment of the present invention, the discrete transformation series has an order of at least 3.

According to one embodiment of the present invention, the controlling unit is configured to generate a controlling signal which modifies a controlling signal of the voltage converter such that a converter output voltage of the voltage converter has an additional cancellation voltage component.

According to one embodiment of the present invention, the controller is the voltage converter controller.

According to one embodiment of the present invention, the controller is implemented in hardware or in software or in a combination of hardware and software.

According to one embodiment of the present invention, a wind turbine that includes a voltage converter, the voltage converter being connectable to a power grid via a filter arrangement and a controller. The controller including an input unit being configured to receive a signal indicative of a line voltage and a controlling unit coupled to the input unit. The controlling unit being configured to (i) add the line voltage indicated by the received signal to an output of the voltage converter with a time delay, and (ii) adjust the time delay such that resonant effects occurring at the filter arrangement are decreased.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

In the drawings, like reference characters generally refer to the same parts throughout the different views. The drawings are not necessarily to scale, emphasis instead generally being placed upon illustrating the principles of the invention.

DETAILED DESCRIPTION

Figure 1:
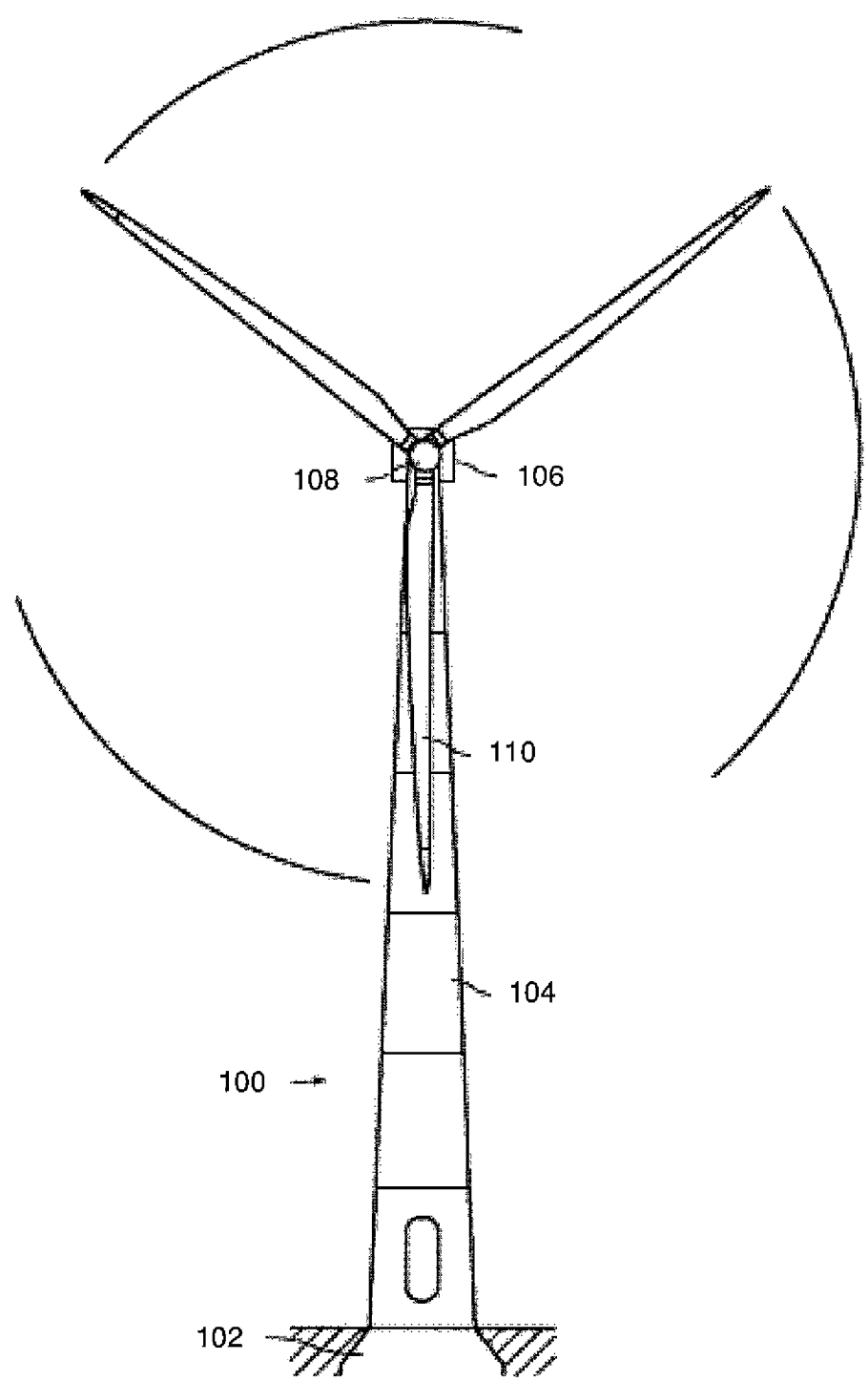
FIG. 1 illustrates a common setup of a conventional wind turbine, according to one embodiment of the invention.

FIG. 1 illustrates a common setup of a conventional wind turbine 100. The wind turbine 100 is mounted on a base 102. The wind turbine 100 includes a tower 104 having a number of tower sections. A wind turbine nacelle 106 is placed on top of the tower 104. The wind turbine rotor includes a hub 108 and at least one rotor blade 110, e.g. three rotor blades 110. The rotor blades 110 are connected to the hub 108 which in turn is connected to the nacelle 106 through a low speed shaft which extends out of the front of the nacelle 106.

Figure 2A:
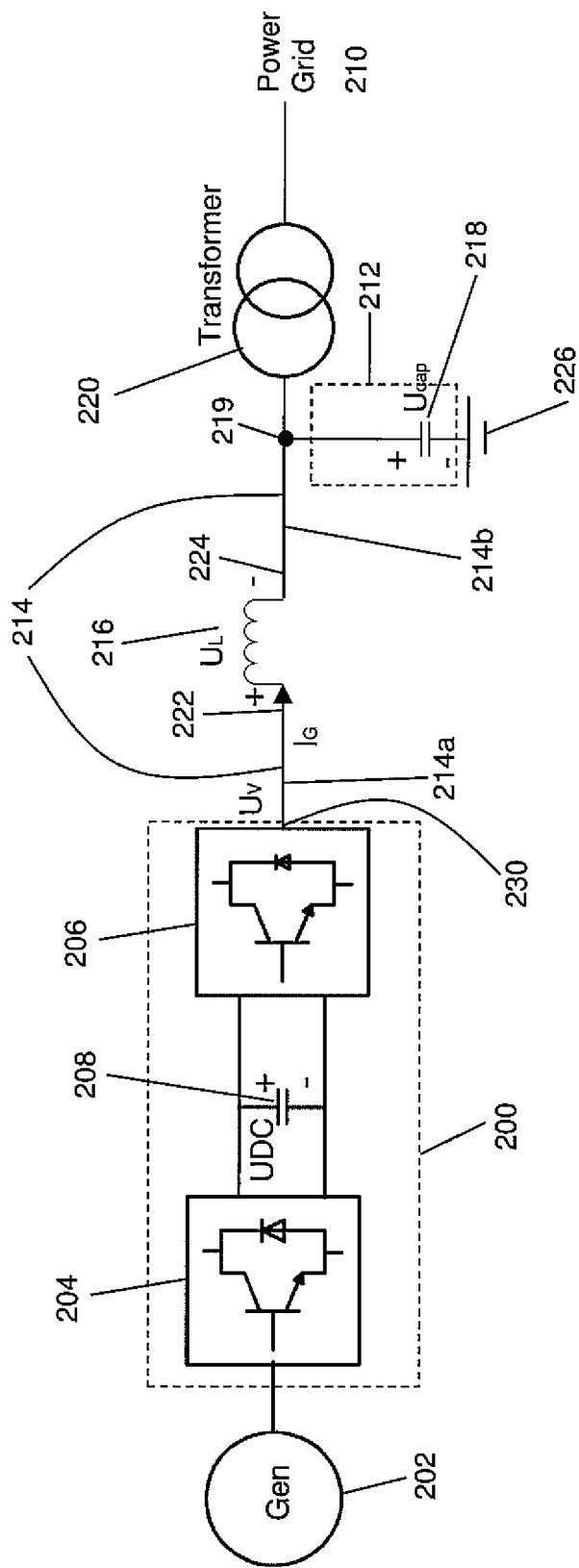
FIGS. 2A-2B illustrate a schematic drawing of an electrical system having a full scale converter configuration, according to embodiments of the invention.

FIG. 2a shows an electrical system 200 of a wind turbine having a converter configuration which may be used in a wind turbine according to embodiments of the present invention. The electrical system 200 is connected to a generator 202 of a wind turbine. In one embodiment, the electrical system 200 may be a voltage converter 200 which includes an AC-to-DC voltage converter 204 (generator-side converter) connected to the generator 202, a DC-to-AC voltage converter 206 (line-side converter), and a DC link 208 connected between the AC-to-DC voltage converter 204 and the DC-to-AC voltage converter 206. Different configurations of the electrical system 200 are possible in other embodiments. The voltage converter 200 is connected to a power grid 210 via a filter arrangement 212.

In more detail, a first part 214a of a power line 214 is connected between an output 230 of the voltage converter 200 and a first end 222 of the inductor 216, and a second part 214b of the power line 214 is connected between a second end 224 of the inductor 216 and the transformer 220. The filter arrangement 212 is connected between the second part 214b of the power line 214 and a ground reference point 226. The filter arrangement 212 is connected to the second part 214b of the power line 214 at a coupling point 219.

Different configurations and/or arrangements of the filter arrangement 212 are possible. In one embodiment, as shown in FIG. 2a, the filter arrangement 212 includes a capacitor 218 connected between the coupling point 219 and the ground reference point 226. In other embodiments, the filter arrangement 212 may include resistor(s), inductor(s) and/or capacitor(s) connected between the coupling point 219 and the ground reference point 226. The resistor(s), inductor(s) and/or capacitor(s) may be arranged in series, parallel or a combination of series and parallel arrangements. The resistor(s), inductor(s) and/or capacitor(s) may for example damp resonant frequency gains as well as reduce high frequency harmonics resulting from switching of semiconductor switches in the converter system.

The electrical system 200, the generator 202 and the transformer 220 may be part of a wind turbine 100 as shown in FIG. 1, and are typically located within the nacelle 106 of the wind turbine 100. The converter configuration of the electrical system 100 is a full scale converter configuration. "Full scale" in this context means that the full power generated by a generator 202 is converted by the voltage converter 200 before being supplied to the power grid 210.

Alternatively, the generator 202 may be a singly or doubly-fed asynchronous generator, a permanent magnet generator, an induction generator or any other type of generator comprising a stator winding. A gear box may also be present to step up the low rotational speed of the low speed shaft to a high rotational speed suitable for operating the generator 202. It is also possible to omit the gear box by using a multi-pole generator 202 suitable for a low rotational speed of the low speed shaft. In this case, the low speed shaft is directly coupled to the generator 202. An alternative transmission may also be provided at the low speed shaft in order to drive the generator 202 as required.

Figure 2B:
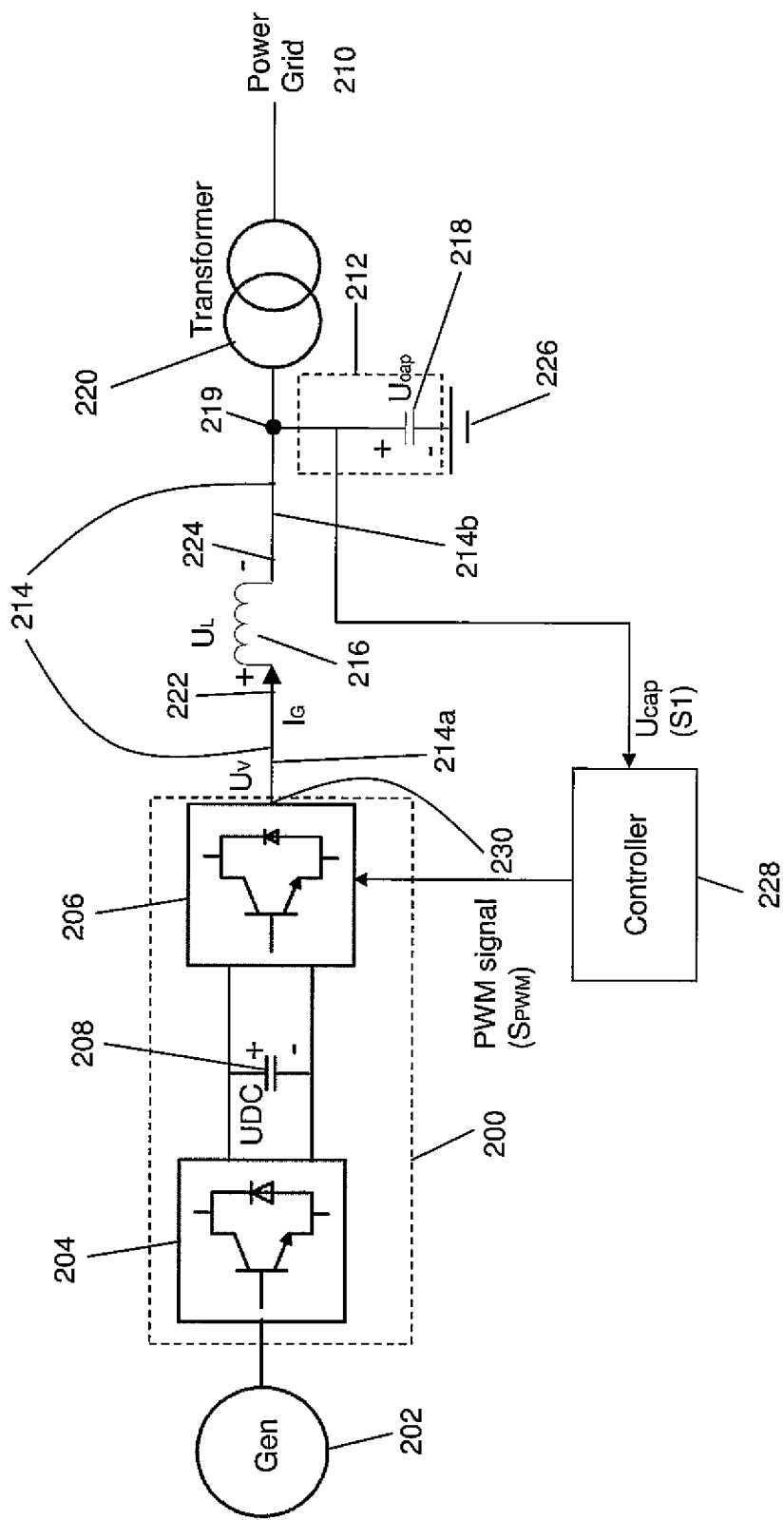

Resonant effects (e.g., resonant currents) may occur between the inductor 216, the transformer 220 and the capacitor 218. To provide active resonance damping for the resonant currents (i.e., to decrease the resonant currents), a controller 228 may be added to the electrical system 200, as shown in FIG. 2b. The controller 228 may be the power controller for the voltage converter 200. In one embodiment, the controller 228 may be implemented into the voltage converter 200. The controller 228 may be implemented in hardware, software or in a combination of hardware and software. As an example, the controller 228 can be a digital controller, with the algorithm implemented in software.

FIG. 2a shows an exemplary illustration of a single phase implementation of the voltage converter 200 and the filter arrangement 212. A three-phase implementation can be used. For the three-phase implementation, the generator 202 has three output terminals which are connected to corresponding three input terminals of the voltage converter 200. Similarly, the voltage converter 200 has three output terminals 230 which are connected to the power grid 210 via three inductors 216, three filter arrangements 212, and a three phase transformer 220. In one embodiment, each filter arrangement 212 has a capacitor 218 connected between the coupling point 219 and the ground reference point 226 resulting in a 'star' connected configuration. In another embodiment, the capacitor 218 of each filter arrangement 212 may be connected in a delta configuration. Thus, there are three power lines 214 connecting the voltage converter 200 to the transformer 212. The line voltage can be obtained by a direct measurement of the three phase line voltages, or deduced from the voltages across the individual capacitors of filter arrangement 212 if these capacitors are connected in the 'star' configuration. In any case, the ideal-cancellation voltage will be deduced from the line voltage.

In the following description, a theoretical background for embodiments of the present invention will be given.

With reference to FIG. 2b, according to an embodiment of the present invention, a line voltage is determined by measuring a voltage at the coupling point 219 (i.e., a voltage which drops across the filter arrangement 212). In one embodiment, if the filter arrangement 212 only includes the capacitor 218 (as shown in FIGS. 2a and 2b), the voltage which drops across the filter arrangement 212 may be the voltage ($U_{cap}$) which drops across the capacitor 218. That is, for a single phase implementation as shown in FIGS. 2a and 2b, the line voltage may be the voltage ($U_{cap}$) which drops across the capacitor 218 (e.g. the filter arrangement 212). For a three-phase implementation, the line voltage may be the voltage which drops across two capacitors 218 (e.g., two filter arrangements 212) arranged in a delta configuration. The determined line voltage is added to the output 230 of the voltage converter 200 (e.g., the first part 214a of a power line 214) with a time delay. That is, the determined line voltage is added to an output voltage signal ($U_v$) of the voltage converter 200) with a time delay. This may be realized by the controller 228 by choosing a PWM signal which controls the voltage converter 200 such that an additional cancellation voltage is applied to the output 230 of the voltage converter 200.

For illustration purposes, a single phase case is presented here where the line voltage may be referred to as the voltage ($U_{cap}$) which drops across the capacitor 218 in the following description. However, as understood by a skilled person, the line voltage is not limited to the voltage ($U_{cap}$) which drops across the capacitor 218 for a three phase system. In the case of a three phase system, the line voltages obtained will be used to derive the ideal cancellation voltage accordingly; and the ideal cancellation voltage would be defined as the voltage when applied on its own without delay to the terminals 222 of the inductors 216 will result in zero voltage drop across the inductors 216 and would thus produce no current change in the inductors 216 (three inductors for a three phase system).

If the applied cancellation voltage is exactly equal (i.e., if $U_v$ applied at the first terminal 222 of the inductor 216 is exactly equal to $U_{cap}$ applied at the second terminal 224 of the inductor 216), an exact voltage cancellation of $U_v$ and $U_{cap}$ will remove the effects of $U_{cap}$ completely from the inductor 216. However, if the voltage cancellation is not perfect with $U_v$ different from $U_{cap}$, and $U_v$ being a discrete and sampled output of $U_{cap}$ and delayed by a time delay $t_{delay}$, the voltage across the inductor 216 will be a voltage signal (neglecting the current feedback from the controller) obtained from a difference between $U_{cap}$ and $U_v$, and will be fed into an integrator formed by the inductor 216. The inductance integrator may reproduce a current ($i_G$) in the inductor 216 (as shown in FIG. 2b) that is in anti-phase with the voltage signal $U_{cap}$. The current ($i_G$) may be equivalent to a current or include a current (i.e. the damping current) which would flow through a fictive resistor ($R_{CAP,\,fictif}$) connected in parallel with the filter arrangement 212 (e.g. the capacitor 218 of the filter arrangement 212).

The above description is illustrated by the following equations and approximation:

$$i_G = \frac{1}{L} \cdot \int -U_{CAP}(\tau) + U_v(\tau) d\tau \qquad (1)$$

$$= \frac{1}{L} \cdot \int -U_{CAP}(\tau) + U_{CAP}(\tau - t_{delay}) d\tau$$

$$= \frac{1}{L} \cdot \int -\frac{\Delta U_{CAP}}{t_{delay}} \cdot t_{delay} \cdot d\tau$$

$$\cong -\frac{t_{delay}}{L} \cdot \int \frac{dU_{CAP}}{d\tau} d\tau$$

$$= -\frac{t_{delay}}{L} \cdot U_{CAP} = -\frac{U_{CAP}}{R_{CAP,\,fictif}}$$

wherein $U_{CAP}(\tau)$ represents the voltage drop across the capacitor at instant $\tau$, $U_v(\tau)$ represents the output voltage signal of the voltage converter at instant $\tau$, which is approximately equal to $U_{CAP}(\tau - t_{delay})$, $t_{delay}$ is the time delay, and L is the inductance of the inductor.

Thus, adding the determined line voltage (e.g. voltage ($U_{cap}$) which drops across the capacitor 218) to the output voltage signal ($U_v$) of the voltage converter 200 with the time delay produces approximately a damping effect of a fictive resistor connected in parallel with the filter arrangement 212 (e.g. the capacitor 218 of the filter arrangement 212). The fictive resistor can be derived as below.

$$R_{CAP,\,fictif} \cong \frac{L}{t_{delay}} \qquad (2)$$

Such a method may allow creation of a damping current as described above without direct current control and can achieve improved damping (i.e. lower transient peak currents).

The determined line voltage (e.g. voltage ($U_{cap}$) which drops across the capacitor) with the time delay can be approximated using the following Maclaurin or Taylor series:

$$U_{CAP}(t + t_{predict}) = U_{CAP}(t) + \frac{dU_{CAP}}{dt}(t) \cdot \frac{t_{predict}}{1!} + \qquad (3)$$

$$\frac{d^2 U_{CAP}}{dt^2}(t) \cdot \frac{t_{predict}^2}{2!} + \frac{d^3 U_{CAP}}{dt^3}(t) \cdot \frac{t_{predict}^3}{3!} + \ldots$$

wherein $U_{CAP}$ is the voltage dropping across the capacitor, and $t_{predict}$ represents an optimization parameter which modifies or adjusts the time delay with which the voltage which drops across the capacitor is applied to the first part of the power line.

The derivatives of the Maclaurin or Taylor series shown in equation (3) may not be applicable for a discrete system. For discrete systems, the derivatives of the Maclaurin or Taylor series shown in equation (3) may be approximated by differences of higher orders. Given a sequence of grid voltages V(n), V(n-1), V(n-2), . . . , each derivative order of the Maclaurin or Taylor series is approximated according to the following formulas:

$$D1(n) = V(n) - V(n - 1); \qquad (4)$$

$$D2(n) = D1(n) - D1(n - 1);$$

$$D3(n) = D2(n) - D2(n - 1);$$

$$\ldots$$

$$Dm(n) = Dm - 1(n) - Dm - 1(n - 1).$$

wherein D1(n), D2(n), D3(n), . . . , Dm(n) represent the discrete approximation for the 1st to mth derivatives of the Maclaurin or Taylor series respectively, V(n) represents the voltage across the capacitor of the nth sample, and V(n-1) represents the voltage across the capacitor of the (n-1)th sample.

For discrete systems, the Maclaurin or Taylor series may be represented using the following equation:

$$V(t_{predict}) = V(n) + D1(n) \cdot (t_{predict}) + D2(n) \cdot (t_{predict}^2/2) + D3 \\ (n) \cdot (t_{predict}^3/(3.2) + \ldots \qquad (5)$$

wherein $V(t_{predict})$ represents the approximated voltage across the capacitor at a time $t_{predict}$ shifted in time from the instance of occurrence of V(n), V(n) represents the voltage across the capacitor of the nth sample, and $t_{predict}$ is an optimization parameter which modifies or adjusts the time delay with which the voltage which drops across the capacitor is applied to the first part of the power line.

Thus, for discrete systems, the time delay can be determined based on the above equation (5). Equation (5) may be termed as a discrete transformation series.

Experimental simulations were conducted with a fixed value of $t_{predict}$ (and thus for a fixed time delay) for different derivative orders of the equation (5). The experimental results show that using at least the terms up to the 3rd derivative order of the equation (5) provide better damping results. Thus, at least the terms up to the 3rd derivative order of the equation (5) are used to determine the time delay. That is, the discrete transformation series (e.g., equation (5)) may have an order of at least 3.

Figure 3:
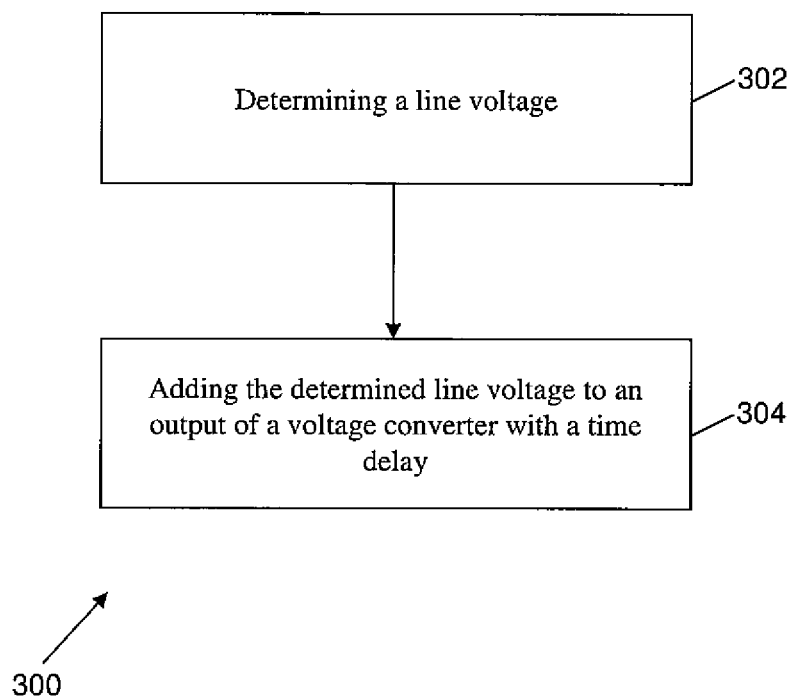
FIG. 3 shows a flow chart diagram of a method of operating a wind turbine, according to one embodiment of the invention.

FIG. 3 shows a flowchart 300 of a method of operating a wind turbine according to an embodiment of the present invention. At 302, a line voltage is determined. At 304, the determined line voltage is added to an output of a voltage converter with a time delay. The time delay is adjusted such that resonant effects occurring at the filter arrangement are decreased.

In more detail, the line voltage may be sampled at regular time intervals in order to generate a plurality of voltage samples. A cancellation voltage may be generated based on the plurality of voltage samples. In one embodiment, the cancellation voltage may be calculated from a linear combination of different voltage sample values being weighted by respective voltage sample weighting coefficients. Some of the voltage sample weighting coefficients respectively depends on an optimization parameter $t_{predict}$ which adjusts the time delay with which the determined line voltage is applied to the output of the voltage converter. The cancellation voltage may be calculated based on equation (5). The cancellation voltage may be directly added to the output of the voltage converter. The cancellation voltage may be updated at regular time intervals.

In one embodiment, the cancellation voltage may be generated by modifying a voltage converter controlling signal.

Figure 4:
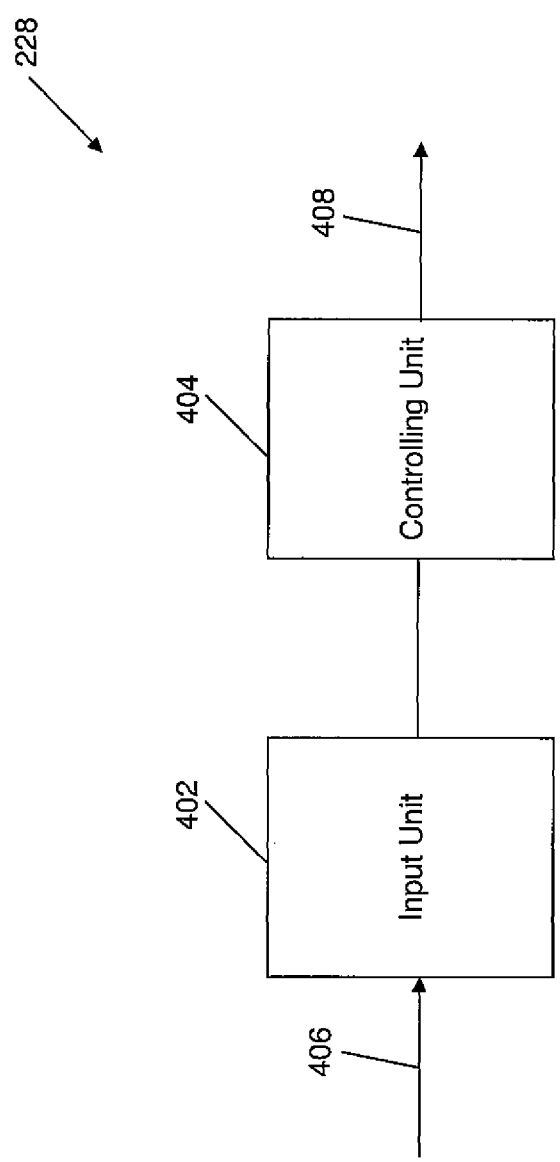
FIG. 4 shows a schematic block diagram of a controller usable for operating a wind turbine, according to one embodiment of the invention.

FIG. 4 shows a possible realization of the controller 228 usable for operating a wind turbine according to an embodiment of the present invention. The controller 228 includes an input unit 402 configured to receive a signal 406 indicative of a line voltage. The controller 228 also includes a controlling unit 404 coupled to the input unit 402. The controlling unit 404 is configured to control a process of adding the line voltage indicated by the received signal to an output of a voltage converter with a time delay, and to adjust the time delay such that resonant effects (like currents) at the filter arrangement (e.g., a capacitor) are decreased. In one embodiment, the controlling unit 404 may output a signal 408 indicative of a line voltage with the time delay.

Figure 5:
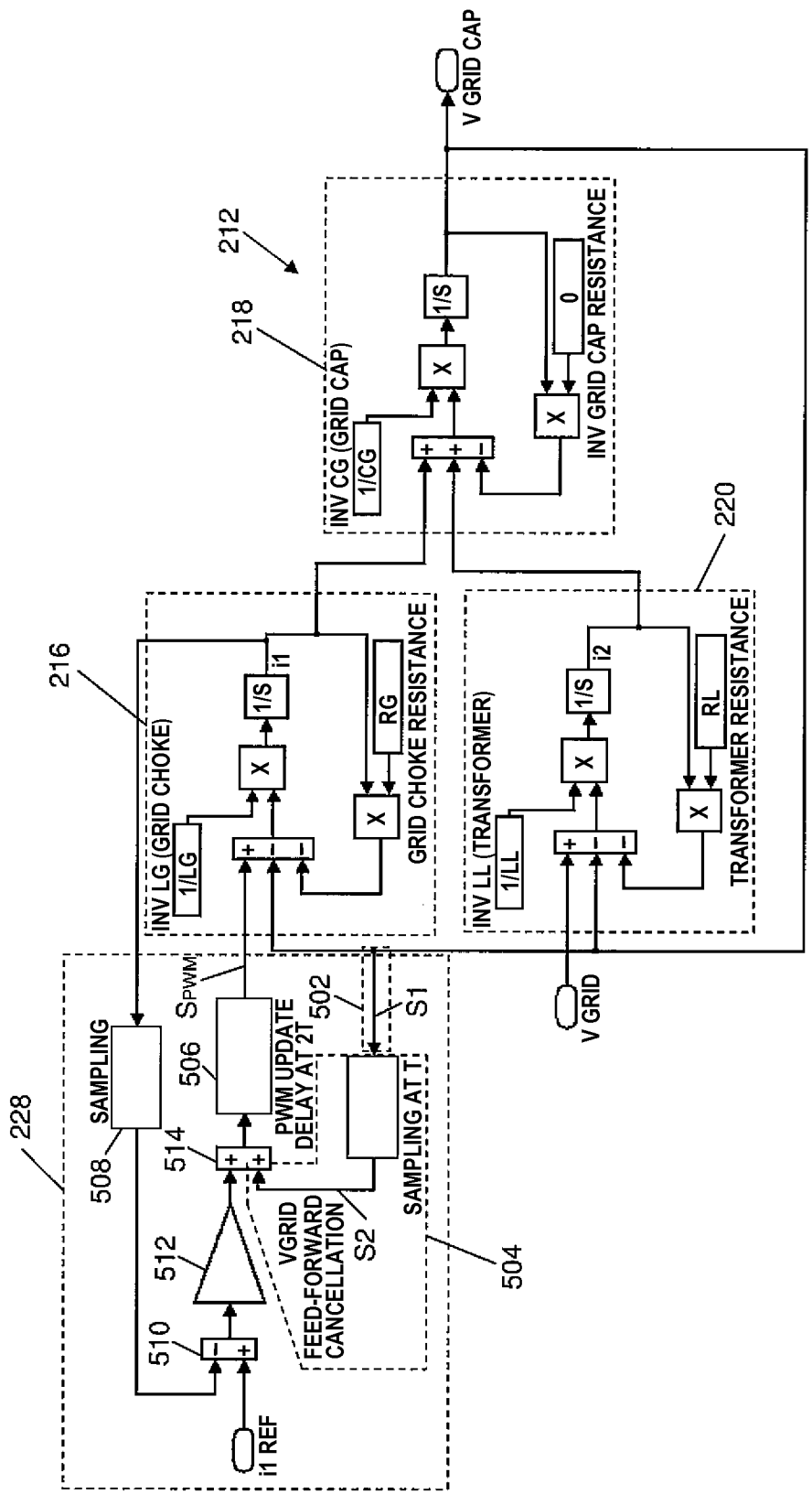
FIG. 5 shows a schematic block diagram of a controller usable for operating a wind turbine, according to one embodiment of the present invention.

FIG. 5 shows a possible realization of the controller 228 shown in FIG. 4. In FIG. 5, a block diagram of a controller 228 coupled to the filter arrangement 212 is shown. In one embodiment, the filter arrangement 212 includes the capacitor 218. The filter arrangement 212 is coupled to the inductor 216 and the transformer 220. The controller 228 includes an input unit 502 which receives a signal (S1) indicative of a line voltage (e.g., the voltage which drops across the capacitor 218). The signal (S1) may be a sampling signal resulting from a sampling process which samples the line voltage at regular time intervals. The controller 228 includes a controlling unit 504 coupled to the input unit 502. The controlling unit 504 receives the signal (S1) from the input unit 502. The controlling unit 504 may determine a time delay ($t_{predict}$) to be applied to the received signal (S1) based on equation (5).

The time delay may be adjusted such that resonant currents at the filter arrangement 212 (or more specifically, between the inductor 216, the transformer 220 and the capacitor 218) are decreased. The time delay may be adjusted such that an optimal or near optimal damping is achieved. Results from experimental simulations show that damping results improve as the time delay is increased until an optimal or near optimal damping is achieved at a particular value of the time delay. Damping results deteriorate if the time delay is increased to a value which is higher than the particular value of the time delay. Therefore, under different resonance situations, an optimal or near optimal damping may be achieved by adjusting the time delay in advance or in real time.

The controlling unit 504 may generate a signal (S2) indicative of a cancellation voltage based on the sampling signal (S1). The controlling unit 504 may calculate the cancellation voltage from a linear combination of different voltage sample values being weighted by respective voltage sample weighting coefficients. Some of the voltage sample weighting coefficients respectively depends on an optimization parameter $t_{predict}$ which adjusts the time delay with which the determined line voltage is applied to the output of the voltage converter. The controlling unit 504 may calculate the cancellation voltage based on equation (5). The controlling unit 504 may add the cancellation voltage signal (S2) to the output 230 of the voltage converter 200, i.e., the output voltage signal ($U_v$) of the voltage converter 200. The process of generating a cancellation voltage signal (S2) based on the sampling signal and adding the cancellation voltage signal (S2) to the output 230 of the voltage converter 200 may be repeated.

The cancellation voltage signal (S2) may be fed into a pulse-width modulated (PWM) unit 506 and the PWM unit 506 may output a PWM signal ($S_{PWM}$).

Block 228 represents a current controller for the inductor current i1 of the inductor 216 based on current-feedback. Block 228 senses the inductor current i1 obtained by current measurement, samples the inductor current i1 through a sampling block 508 (i.e. the current feedback), and obtains a difference of the inductor current it and a reference inductor current i1_Ref using a summing junction block 510. Block 228 has a compensator block (KP_GCC) 512 which provides an output signal based on the difference obtained. The output signal of the compensator block (KP_GCC) 512 may be added to the cancellation voltage signal (S2) using a summing junction block 514. The combined signal of the output signal of the compensator block (KP_GCC) 512 and the cancellation voltage signal (S2) may be converted to a PWM output signal ($S_{PWM}$) using the PWM unit 506. In short, block 228 represents one possible feedback controller working continuously, operating with or without the presence of the cancellation voltage mentioned for damping. The cancellation voltage computed based on equation (5) is added to a command voltage of block 228 (e.g. output voltage of the voltage converter 200). The reference inductor current i1_REF, the compensator block KP_GCC 512, and the sampling block 508 for the inductor current i1 do not affect the processing of the time-delay. The sampling of the line voltage (e.g. Ucap), which is part of cancellation voltage signal (S2) and the PWM unit 506 may affect the optimal value for $t_{predict}$ in equation (5). The affecting factors due to the sampling of the line voltage and the PWM unit 506 are taken into consideration during simulation, and the optimal $t_{predict}$ is obtained under desired conditions of the sampling rate of the sampling signal (S1) as well as the PWM delay.

In one embodiment, the controlling unit 504 may generate a controlling signal which controls a voltage generating unit to generate the cancellation voltage which is directly added to the output of the voltage converter. In one embodiment, the voltage generating unit (not shown) may be implemented into the controlling unit 504 (i.e., an integral unit of the controlling unit 504). In another embodiment, the voltage generating unit (not shown) may be a separate unit which is coupled to the controlling unit 504.

In another embodiment, with reference to FIG. 2b, the controlling unit 504 may generate a controlling signal which modifies a controlling signal of the voltage converter 200 such that the output voltage of the voltage converter 200 has an additional cancellation voltage component.

Referring back to FIG. 2b, the controller 228 may output the PWM signal ($S_{PWM}$) to the voltage converter 200 (e.g. the DC-to-AC voltage converter 206 of the voltage converter 200). The PWM signal ($S_{PWM}$) may be equivalent to or may include the signal (S2) with the time delay. The PWM signal ($S_{PWM}$) may adjust the output voltage signal ($U_v$) of the voltage converter 200 such that the cancellation voltage signal (S2) is added to the output voltage signal ($U_v$) of the voltage converter 200. The output voltage signal ($U_v$) of the voltage converter 200 may thus be modified. A converter output current signal corresponding to the modified converter output voltage signal may be outputted. The converter output current signal may include a damping current to decrease the resonant currents occurring between the inductor 216, the capacitor 218 and the transformer 220. In one embodiment, the damping current may be applied across the filter arrangement 212. The damping current may produce approximately a damping effect of a fictive resistor connected in parallel with the filter arrangement 212 (e.g. the capacitor 218 of the filter arrangement 212).

The above-described method provides an active damping approach without current control for anti-resonance control. The above-described method allows active damping to be applied with a lower current controller bandwidth. The above-described method achieves damping by adjusting a value of the time delay, and allows optimization of the controller resulting in the possibility of grid capacitance reduction (i.e. allows a lower capacitance to be used—the lower capacitance may be about 60% reduction of the generally used capacitance). The sizing of the passive resonance filter may be reduced or the passive resonance filter may be removed. The above-described method may provide a more stable and robust control of the line side of the converter connected between the wind turbine and the power grid.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of operating a wind turbine comprising a voltage converter, the voltage converter being connectable to a power grid via a filter arrangement, the method comprising:
    determining a line voltage based on a plurality of voltage samples; and
    adding the determined line voltage to an output of the voltage converter with a time delay, wherein the time delay is selected to reduce resonant effects occurring at the filter arrangement, wherein adding the determined line voltage comprises:
        generating a cancellation voltage based on the plurality of voltage samples, and
        adding the cancellation voltage to the output of the voltage converter.

2. The method of claim 1, wherein the line voltage is sampled at a first regular time interval in order to generate the plurality of voltage samples.

3. The method of claim 2, further comprising:
    updating the cancellation voltage at a second regular time interval.

4. The method of claim 1, wherein the cancellation voltage is generated from a linear combination of different voltage sample values that are weighted by respective voltage sample weighting coefficients.

5. The method of claim 4, wherein at least one of the voltage sample weighting coefficients is based on an optimization parameter $t_{predict}$ which adjusts the time delay with which the determined line voltage is applied to the output of the voltage converter.

6. The method of claim 4, wherein the cancellation voltage is generated using a discrete transformation series.

7. The method of claim 6, wherein the discrete transformation series has an order of at least 3.

8. The method of claim 7, wherein the cancellation voltage is generated by modifying a voltage converter controlling signal.

9. A controller usable in a wind turbine that comprises a voltage converter that is connectable to a power grid via a filter arrangement, the controller comprising:
    an input unit configured to receive a signal indicative of a line voltage, wherein the received signal includes a plurality of samples of the line voltage; and
    a controlling unit coupled to the input unit and configured to:
        add the line voltage indicated by the received signal to an output of the voltage converter with a time delay, and
        select the time delay to reduce resonant effects occurring at the filter arrangement,
    wherein adding the line voltage comprises:
        generating a cancellation voltage based on the sampling signal, and
        adding the cancellation voltage to the output of the voltage converter.

10. The controller of claim 9, wherein the received signal results from sampling the line voltage at a first regular time interval.

11. The controller of claim 10, wherein adding the line voltage further comprises updating the cancellation voltage at a second regular time interval.

12. The controller of claim 9, wherein the controlling unit is configured to generate the cancellation voltage from a linear combination of different voltage sample values of the sampling signal that are weighted by respective voltage sample weighting coefficients.

13. The controller of claim 12, wherein at least one of the voltage sample weighting coefficients is based on an optimization parameter $t_{predict}$ which adjusts the time delay with which the line voltage is applied to the output of the voltage converter.

14. The controller of claim 12, wherein the cancellation voltage is generated using a discrete transformation series.

15. The controller of claim 14, wherein the discrete transformation series has an order of at least 3.

16. The controller of claim 12, wherein the controlling unit is configured to generate a controlling signal which modifies a controlling signal of the voltage converter such that a converter output voltage of the voltage converter has an additional cancellation voltage component.

17. The controller of claim 9, wherein the controller is a voltage converter controller.

18. The controller of claim 9, wherein the controller is implemented in at least one of hardware and software.

19. A wind turbine, comprising:
   a voltage converter that is connectable to a power grid via a filter arrangement; and
   a controller comprising:
      an input unit configured to receive a signal indicative of a line voltage, wherein the received signal includes a plurality of samples of the line voltage; and
      a controlling unit coupled to the input unit and configured to:
         add the line voltage indicated by the received signal to an output of the voltage converter with a time delay, and
         select the time delay to reduce resonant effects occurring at the filter arrangement,
   wherein adding the line voltage comprises:
      generating a cancellation voltage based on the sampling signal, and
      adding the cancellation voltage to the output of the voltage converter.

20. The wind turbine of claim 19, wherein adding the line voltage further comprises updating the cancellation voltage at a regular time interval.

\* \* \* \* \*